(No Model.)
A. ZERRENNER.
MANURE SCRAPER FOR PLOWS.
No. 373,630. Patented Nov. 22, 1887.
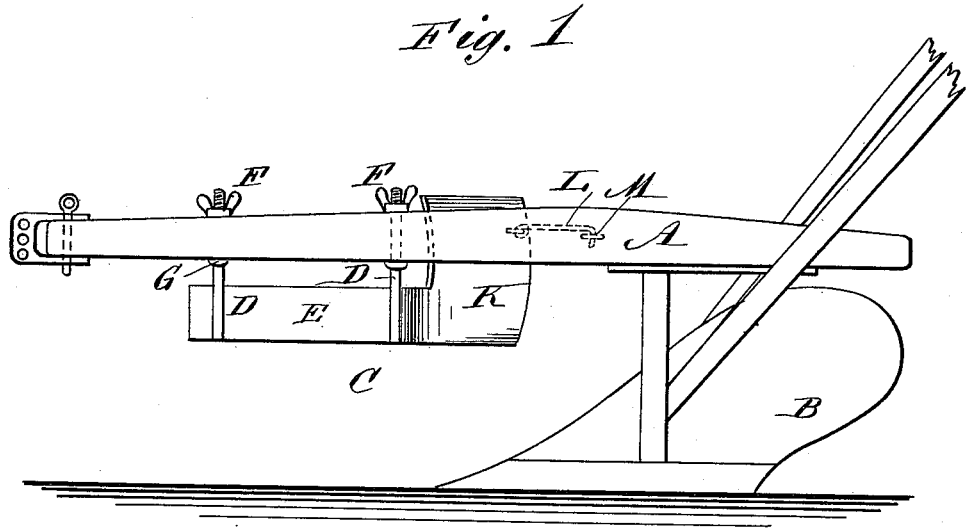
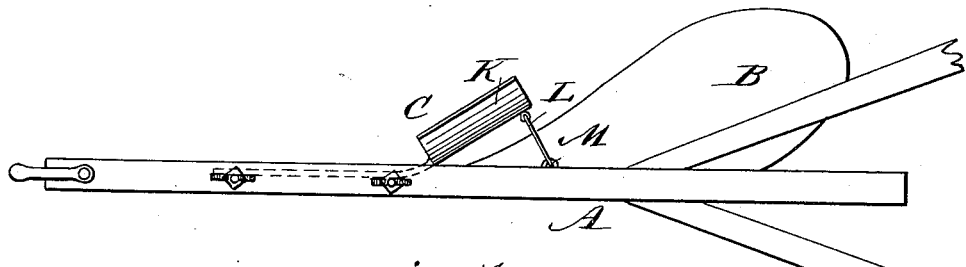
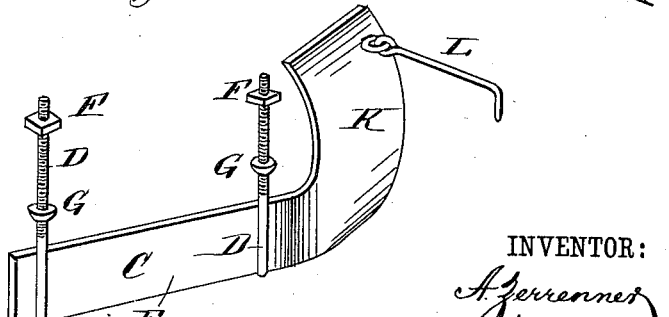
WITNESSES:
C. Neveux
C. Sedgwick
INVENTOR:
A. Zerrenner
BY Munn & Co.
ATTORNEYS.

United States Patent Office.

ADOLYPH ZERRENNER, OF NEW YORK, N. Y., ASSIGNOR TO CHARLES H. GRUBE, OF SAME PLACE.

MANURE-SCRAPER FOR PLOWS.

SPECIFICATION forming part of Letters Patent No. 373,630, dated November 22, 1887.

Application filed May 4, 1887. Serial No. 237,074. (No model.)

*To all whom it may concern:*

Be it known that I, ADOLYPH ZERRENNER, of the city, county, and State of New York, have invented a new and Improved Manure-Scraper for Plows, of which the following is a full, clear, and exact description.

My invention has for its object to provide an improved manure scraper for attachment to a plow, so constructed that it can be easily applied and detached, can be adjusted for the beams of different plows, will be securely held in place, and will effectually divide the layer of manure and throw it into the preceding furrow, so that it will be covered by the soil overturned by the plowshare following thereafter.

The invention consists in certain novel features of construction embodied in the manure-scraper and its attachment to the plow, as hereinafter fully described and particularly claimed.

Reference is to be had to the accompanying drawings, forming a part of this specification, in which similar letters of reference indicate corresponding parts in all the figures.

Figure 1 is a side elevation of a plow having my improvement applied. Fig. 2 is a plan view of the same. Fig. 3 is a detail view of the manure-scraper attachment.

A designates the beam, and B the share, of an ordinary plow.

The manure-scraper C is attached to the plow-beam directly in front of the share by means of two vertical long bolts, D, rigidly secured at their lower ends to either end of the forward rectangular runner E of the manure-scraper and passed upward through the plow-beam A. Nuts F and G, screwing on the long bolts D, serve to clamp the plow-beam firmly therebetween and allow for beams of different thickness. The lower edge of the straight vertical runner E, which is held directly below and in line with the plow-beam, is adapted to just reach the surface of the unplowed ground. The rear portion of the metal plate, from which the scraper C is formed, is bent laterally outward just beyond the rear bolt, D, and a short distance beyond said bend is greatly widened and concaved outwardly to form a deflector, K, in the shape of a cylindrical segment, as shown. The deflector is steadied by a hooked rod, L, connected by an eye-joint to the rear upper corner of the same and engaging an eye, M, on the plow-beam.

When the plow is opening the furrows, the long runner C divides the layer of manure on the unplowed ground directly in front of the advancing plow, and the concave deflector K throws the same into the furrow just preceding, so that the plowshare directly following thereafter will turn over the soil and cover the deposited manure.

Having thus fully described my invention, what I claim as new, and desire to secure by Letters Patent, is—

1. As an improved article of manufacture, the manure-scraper C for plows, consisting of the straight vertical runner E, having its rear end widened and concaved outwardly to form a deflector, K, and adapted to be secured to a plow-beam with the vertical runner directly below and approximately parallel with the said beam, as set forth.

2. In a manure-scraper attachment for plows, the combination, with the plow-beam A, of the scraper C, consisting of the vertical runner E, having the concave widened deflector K at its rear end and provided with the bolts D, having nuts on their upper ends, and the hooked rod L, substantially as herein shown and described.

ADOLYPH ZERRENNER.

Witnesses:
CLARENCE L. BURGER,
C. SEDGWICK.